US008902964B2

(12) United States Patent
Aguilar-Arreola et al.

(10) Patent No.: US 8,902,964 B2
(45) Date of Patent: Dec. 2, 2014

(54) EQUALIZATION EFFORT-BALANCING OF TRANSMIT FINITE IMPULSE RESPONSE AND RECEIVE LINEAR EQUALIZER OR RECEIVE DECISION FEEDBACK EQUALIZER STRUCTURES IN HIGH-SPEED SERIAL INTERCONNECTS

(71) Applicant: Intel Corporation, Santa Clara, CA (US)

(72) Inventors: Manuel A. Aguilar-Arreola, Folsom, CA (US); Eric J. Msechu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/631,877

(22) Filed: Sep. 29, 2012

(65) Prior Publication Data

US 2014/0092952 A1 Apr. 3, 2014

(51) Int. Cl.
| H03H 7/30 | (2006.01) |
| H03H 7/40 | (2006.01) |
| H03K 5/159 | (2006.01) |
| H04L 27/01 | (2006.01) |

(52) U.S. Cl.
CPC ..................................... *H04L 27/01* (2013.01)
USPC ........... 375/233; 375/232; 375/231; 375/346; 375/257; 375/296; 708/322; 708/323

(58) Field of Classification Search
CPC .................. H04L 25/03038; H04L 25/03133; H04L 25/03019; H04L 25/03057; H04L 2025/03617; H04L 2025/03477; H04L 2025/0349; H04L 2025/03503; H04L 25/0272; H04L 25/0292; H04L 25/028; H04L 25/08; H04L 7/0008; H04L 27/368; H04L 25/03343; H04L 27/2647; H04L 1/20; H03H 21/0012; H03H 21/0043; H03H 17/0294; H03F 1/3247; H03F 1/3294; H03F 2201/3233; H04B 1/1027; H04B 1/123; H04B 1/1036; H04B 3/23
USPC ......... 375/233, 232, 231, 234, 235, 346, 257, 375/219, 222, 220, 296, 285, 284; 708/322, 708/323
See application file for complete search history.

(56) References Cited

U.S. PATENT DOCUMENTS 7,949,041 B2 * 5/2011 Zerbe et al. ................... 375/233
2004/0193669 A1 9/2004 Shirani
(Continued)

FOREIGN PATENT DOCUMENTS

WO 2014/051759 A1 4/2014

OTHER PUBLICATIONS

International Search Report and Written Opinion received for PCT Patent Application No. PCT/US2013/046555, mailed on Sep. 27, 2013, 9 pages.

(Continued)

*Primary Examiner* — Phuong Phu
(74) *Attorney, Agent, or Firm* — Caven & Aghevli LLC (57) ABSTRACT

Methods and apparatus for provision of equalization effort-balancing of transmit (TX) Finite Impulse Response (FIR) and receive (RX) Linear Equalizer (LE) or RX Decision Feedback Equalizer (DFE) structures in high-speed serial interconnects are described. In some embodiments, data corresponding to a plurality of transmit equalization values and a plurality of receive equalization values for each lane of a link having a plurality of lanes is detected. At least one of the plurality of the transmit equalization values and at least one of the plurality of the receive equalization values are selected for each lane of the plurality of lanes of the link based on detection of saturation in a Decision Feedback Equalizer (DFE) tap of a corresponding lane of the link. Other embodiments are also claimed and/or disclosed.

30 Claims, 6 Drawing Sheets

(56) References Cited

U.S. PATENT DOCUMENTS

| | | | |
|---|---|---|---|
| 2005/0105641 A1* | 5/2005 | Cheung et al. | 375/296 |
| 2005/0201454 A1 | 9/2005 | Chaudhuri et al. | |
| 2006/0093028 A1 | 5/2006 | Balan et al. | |
| 2009/0245110 A1* | 10/2009 | Connolly et al. | 370/236 |
| 2009/0257514 A1* | 10/2009 | Connolly et al. | 375/257 |
| 2010/0040131 A1* | 2/2010 | Tate et al. | 375/232 |
| 2010/0141340 A1 | 6/2010 | Huang et al. | |
| 2010/0296566 A1 | 11/2010 | Beyene et al. | |
| 2010/0329325 A1 | 12/2010 | Mobin et al. | |
| 2011/0222594 A1 | 9/2011 | Zerbe et al. | |
| 2013/0051442 A1* | 2/2013 | Cooper et al. | 375/222 |
| 2013/0322506 A1* | 12/2013 | Zerbe et al. | 375/224 |

OTHER PUBLICATIONS

Office Action received for U.S. Appl. No. 13/767,881, mailed on Jan. 6, 2014, 7 pages.

* cited by examiner

EQUALIZATION EFFORT-BALANCING OF TRANSMIT FINITE IMPULSE RESPONSE AND RECEIVE LINEAR EQUALIZER OR RECEIVE DECISION FEEDBACK EQUALIZER STRUCTURES IN HIGH-SPEED SERIAL INTERCONNECTS

FIELD

The present disclosure generally relates to the field of electronics. More particularly, an embodiment of the invention relates to techniques for provision of equalization effort-balancing of transmit (TX) Finite Impulse Response (FIR) and receive (RX) Linear Equalizer (LE) or RX Decision Feedback Equalizer (DFE) structures in high-speed serial interconnects.

BACKGROUND

One common Input/Output (I/O or IO) interface used in computer systems is Peripheral Component Interconnect Express (PCIe). As PCIe speeds are increased, however, some resulting signal distortion reduce signal communication reliability. For example, Inter-Symbol Interference (ISI) generally refers to a form of signal distortion where one symbol interferes with subsequent symbols. This unwanted signal distortion can have a similar effect as noise that makes signal communication less reliable. And, some high-speed serial I/O implementations (such as PCIe) operate at frequency ranges at which the ISI becomes a major challenge for achieving a target high-speed data transfer.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments are practiced without the specific details. In other instances, well-known methods, procedures, components, and circuits have not been described in detail so as not to obscure the particular embodiments. Various aspects of embodiments of the invention are performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some embodiments improve the quality and/or speed of high-speed serial I/O channels or links via various techniques, such as digital signal processing, signal integrity and/or non-linear analysis, etc. Such techniques can be used to improve the overall channel quality, e.g., at PCIe 3.0 speeds and beyond. The PCIe 3.0 can be implemented in accordance with PCI Express Base Specification 3.0, Revision 3.0, version 1.0 Nov. 10, 2010 and Errata for the PCI Express Base Specification Revision 3.0, Oct. 20, 2011. At least an embodiment balances the equalization effort in high-speed links with TX FIR and RX (LE/DFE) architectures.

As mentioned before, some high-speed serial I/O implementations (such as PCIe 3.0) operate at frequency ranges at which the ISI becomes a major challenge for achieving a target high-speed data transfer. To eliminate issues with ISI, some techniques can be used for the transceiver design to compensate for the ISI-caused distortion. Some techniques involve two equalization stages in series (as will be further discussed with reference to FIG. 3): (1) Transmitter Equalization: this is intended to help to pre-emphasize the high frequency content of the transmitted signal over the lower frequency content (e.g., pre-distortion to counteract channel-induced distortion at high frequencies); and (2) Receiver Equalization. Here the receiver path is composed of a feed-forward (FFE) equalizer stage, followed by a Decision Feedback Equalizer (DFE) stage. The FFE equalizer stage is generally a Linear Equalizer (LE) in discrete or continuous time LE (CTLE) to compensate pre-cursor ISI, but it does also amplify link-induced additive noise. The DFE stage can be non-linear and based on past decisions such that it can mitigate noise-enhancement of the FFE stage and compensate for residual ISI.

Moreover, the PCIe 3.0 specification details the design constraints of the TX FIR and specifies the behavioral model of the receiver equalization. The behavioral model specifies the receiver equalization stages mentioned above, so many implementations of PCIe 3.0 I/O follow that architecture. In some implementations, the receiver equalization is adaptive, that is, the filters' coefficients are adjusted based on measurements on the received data pattern. In some cases, adaptation is limited to the DFE stage via the Least Mean-Squares (LMS) algorithm. This adaptation is used to guarantee the link's quality, measured via metrics such as those obtained by receiver voltage and timing margining methods. This adaptive filtering remains active to compensate for deviations due to silicon implementation and link quality variations.

Furthermore, PCIe 3.0 specifies the possibility to perform additional receiver adaptation via the equalization part of the speed change training protocol. In this mode, the receivers take turns to tune the link partner's TX equalizer to improve the link quality beyond fixed TX equalization points defined as "presets". This specification-defined mechanism uses the PCIe 3.0 training protocol and the link itself as the vehicle to transfer the adjustments to the link partner's TX which attempts to avoid sidebands or the need for reference signals. For the case of PCIe 3.0 determining which coefficient sets (such as FIR tap values) are sent to tune the link partner's TX FIR is implementation-specific and does not have to follow any adaptive filtering method.

For this reason, implementations of PCIe 3.0 fail to utilize the receiver's adaptation to tune the TX equalizer of the link partner since TX equalizer adaptation is de-coupled from RX equalizer. This in turn motivates work-around strategies like the use of a "best preset" found via offline link analysis for every platform or via in-platform margining techniques. However, presets are meant as starting points, e.g., used to guarantee a base link Bit Error Rate (BER) of less than $10^{-4}$, to assure that the rest of the equalization protocol can take place. Also, some software-based algorithms to determine the best coefficient sets for the link partner's TX FIR still generalize for all lanes relying on presets and margining, thus becoming quite time-consuming and not as flexible as a per-lane training method. For some platforms, like short channels, presets are sufficient to achieve target BER and therefore these methods are applicable.

Additionally, it is possible that the RX Analog Front End is tuned to operate at a given equalization region just to enable the use of one preset. For example, it can be tuned to compensate for a "worst case ISI" for long channel scenarios where long channel presets are used. This can however cause unexpected behavior of the DFE because the TX FIR and CTLE tend to over-compensate high frequency symbols and introduce post-cursor ISI that the DFE can struggle to correct.

In the cases mentioned above, the notion of balancing the equalization effort across the link is not used at all. To this end, some embodiments balance the series concatenated equalizers operating on a channel that follows in order: TX FIR, link, FFE/CTLE, and DFE. The equalization balancing is done by tuning the TX FIR tap weights in conjunction with changes in the RX equalization taps for FFE/CTLE and automatic adjustment of the DFE taps. This approach is capable of providing the flexibility to cover many operating conditions via a wider equalization space exploration than offered by any presets-only strategy. The logic used to perform various operations herein can also be implemented in firmware, BIOS (Basic Input/Output System), etc.

Furthermore, such a Balanced Equalization Effort (BEE) is not limited to PCIe 3.0 and is applicable to any high-speed link, e.g., having a controllable TX equalizer and adaptive yet controllable and observable RX equalizer(s). For example, some (BEE) embodiments overcome the limitations of a fixed preset or best preset approach by: (1) offering more feasible operating points of the TX FIR and adjusting the behavior of the CTLE/FFE on a per-lane basis (which can account for lane to lane routing differences); (2) not relying on receiver margining (e.g., voltage swings or jitter injection) which can affect the state of the controller stack; and/or (3) improving speed, e.g., taking less than 400 ms for wide ×16 links, in a software implementation which can not yet be optimized for speed (contrast this to the preset margining method used which takes more than 1 s even in its most optimized form).

Figure 1:
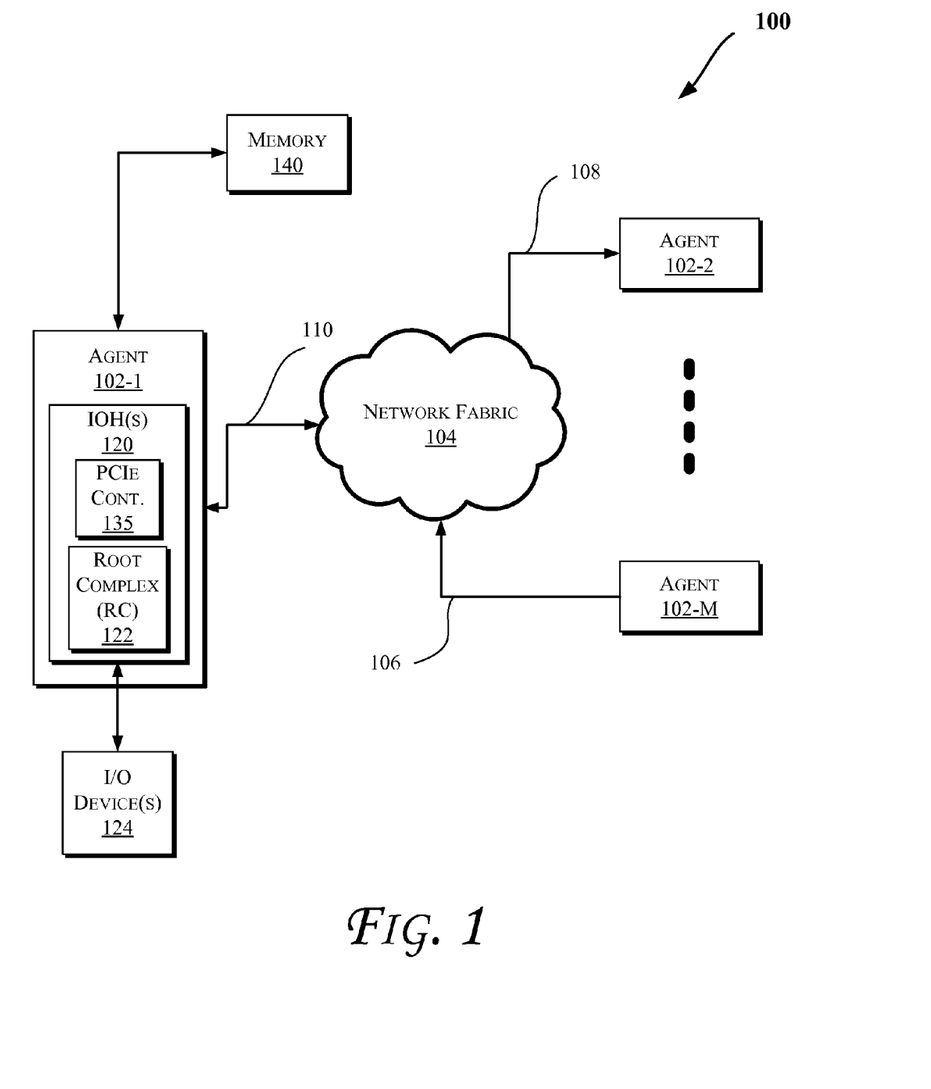
FIGS. 1-2 and 6-7 illustrate block diagrams of embodiments of computing systems, which are utilized to implement various embodiments discussed herein.

Various embodiments are discussed herein with reference to a computing system component, such as the components discussed herein, e.g., with reference to FIGS. 1-2 and 6-7. More particularly, FIG. 1 illustrates a block diagram of a computing system 100, according to an embodiment of the invention. The system 100 includes one or more agents 102-1 through 102-M (collectively referred to herein as "agents 102" or more generally "agent 102"). In an embodiment, the agents 102 are components of a computing system, such as the computing systems discussed with reference to FIGS. 2 and 6-7.

As illustrated in FIG. 1, the agents 102 communicate via a network fabric 104. In an embodiment, the network fabric 104 can include one or more interconnects (or interconnection networks) that communicate via a serial (e.g., point-to-point) link and/or a shared communication network. For example, some embodiments can facilitate component debug or validation on links that allow communication with fully buffered dual in-line memory modules (FBD), e.g., where the FBD link is a serial link for coupling memory modules to a host controller device (such as a processor or memory hub). Debug information is transmitted from the FBD channel host such that the debug information is observed along the channel by channel traffic trace capture tools (such as one or more logic analyzers).

In one embodiment, the system 100 can support a layered protocol scheme, which includes a physical layer, a link layer, a routing layer, a transport layer, and/or a protocol layer. The fabric 104 further facilitates transmission of data (e.g., in form of packets) from one protocol (e.g., caching processor or caching aware memory controller) to another protocol for a point-to-point network. Also, in some embodiments, the network fabric 104 can provide communication that adheres to one or more cache coherent protocols.

Furthermore, as shown by the direction of arrows in FIG. 1, the agents 102 transmit and/or receive data via the network fabric 104. Hence, some agents utilize a unidirectional link while others utilize a bidirectional link for communication. For instance, one or more agents (such as agent 102-M) transmit data (e.g., via a unidirectional link 106), other agent(s) (such as agent 102-2) receive data (e.g., via a unidirectional link 108), while some agent(s) (such as agent 102-1) both transmit and receive data (e.g., via a bidirectional link 110).

Also, in accordance with an embodiment, one or more of the agents 102 include one or more Input/Output Hubs (IOHs) 120 to facilitate communication between an agent (e.g., agent 102-1 shown) and one or more Input/Output ("I/O" or "IO") devices 124 (such as PCIe I/O devices). The IOH 120 includes a Root Complex (RC) 122 (that includes one or more root ports) to couple and/or facilitate communication between components of the agent 102-1 (such as a processor, memory subsystem, etc.) and the I/O devices 124 in accordance with PCIe specification (e.g., in accordance with PCI Express Base Specification 3.0, also referred to as PCIe 3.0). In some embodiments, one or more components of a multi-agent system (such as processor core, chipset, input/output hub, memory controller, etc.) include the RC 122 and/or IOHs 120, as will be further discussed with reference to the remaining figures.

Additionally, the agent 102 includes a PCIe controller 135 to manage various operations of a PCIe interface including, for example, to improve the quality and/or speed of high-speed (e.g., serial) I/O channels of PCIe components in the agent 102. Further, as illustrated in FIG. 1, the agent 102-1 has access to a memory 140. As will be further discussed with reference to FIGS. 2-7, the memory 140 stores various items including for example an OS, a device driver, etc.

Figure 2:
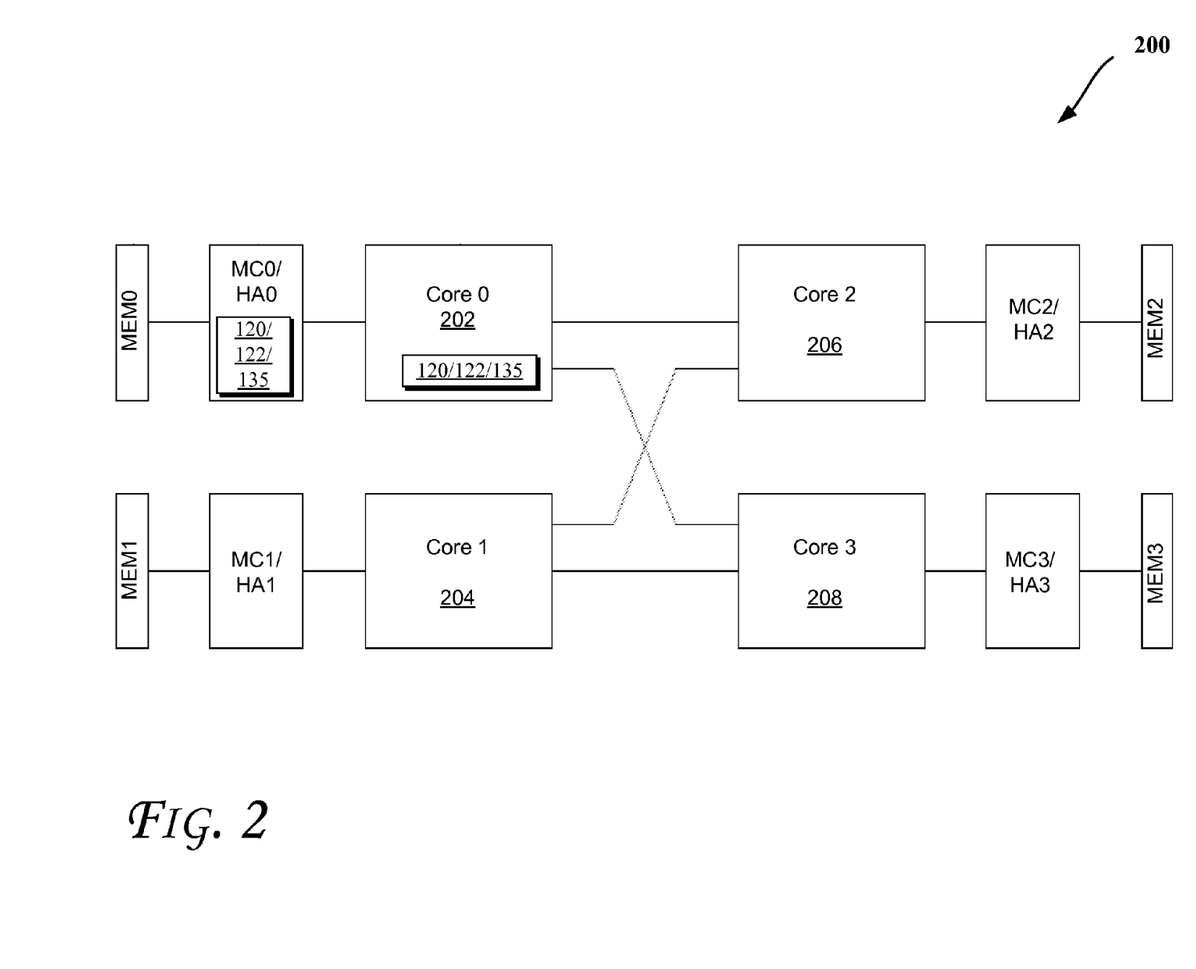

More specifically, FIG. 2 is a block diagram of a computing system 200 in accordance with an embodiment. System 200 includes a plurality of sockets 202-208 (four shown but some embodiments can have more or less socket). Each socket includes a processor and one or more of IOH 120, RC 122, and PCIe Controller 135. In some embodiments, IOH 120, RC 122, and/or PCIe Controller 135 can be present in one or more components of system 200 (such as those shown in FIG. 2). Further, more or less 120, 122, and/or 135 blocks are present in a system depending on the implementation. Additionally, each socket is coupled to the other sockets via a point-to-point (PtP) link, or a differential interconnect, such as a Quick Path Interconnect (QPI), MIPI (Mobile Industry Processor Interface), etc. As discussed with respect the network fabric 104 of FIG. 1, each socket is coupled to a local portion of system memory, e.g., formed by a plurality of Dual Inline Memory Modules (DIMMs) that include dynamic random access memory (DRAM).

In another embodiment, the network fabric may be utilized for any System on Chip (SoC) application, utilize custom or standard interfaces, such as, ARM compliant interfaces for AMBA (Advanced Microcontroller Bus Architecture), OCP (Open Core Protocol), MIPI (Mobile Industry Processor Interface), PCI (Peripheral Component Interconnect) or PCIe (Peripheral Component Interconnect Express).

Some embodiments use a technique that enables use of heterogeneous resources, such as AXI/OCP technologies, in a PC (Personal Computer) based system such as a PCI-based system without making any changes to the IP resources themselves. Embodiments provide two very thin hardware blocks, referred to herein as a Yunit and a shim, that can be used to plug AXI/OCP IP into an auto-generated interconnect fabric to create PCI-compatible systems. In one embodiment a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connects directly to a non-PC interconnect, such as an AXI/OCP interconnect. In various implementations, this bus may be an OCP bus.

In some embodiments, the Yunit implements PCI enumeration by translating PCI configuration cycles into transactions that the target IP can understand. This unit also performs address translation from re-locatable PCI addresses into fixed AXI/OCP addresses and vice versa. The Yunit may further implement an ordering mechanism to satisfy a producer-consumer model (e.g., a PCI producer-consumer model). In turn, individual IPs are connected to the interconnect via dedicated PCI shims. Each shim may implement the entire PCI header for the corresponding IP. The Yunit routes all accesses to the PCI header and the device memory space to the shim. The shim consumes all header read/write transactions and passes on other transactions to the IP. In some embodiments, the shim also implements all power management related features for the IP.

Thus, rather than being a monolithic compatibility block, embodiments that implement a Yunit take a distributed approach. Functionality that is common across all IPs, e.g., address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g., more than 90%) is common across all IPs. This enables a rapid reconfiguration of an existing shim for a new IP. Some embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

As shown in FIG. 2, each socket is coupled to a Memory Controller (MC)/Home Agent (HA) (such as MC0/HA0 through MC3/HA3). The memory controllers are coupled to a corresponding local memory (labeled as MEM0 through MEM3), which can be a portion of system memory (such as memory 612 of FIG. 6). In some embodiments, the memory controller (MC)/Home Agent (HA) (such as MC0/HA0 through MC3/HA3) can be the same or similar to agent 102-1 of FIG. 1 and the memory, labeled as MEM0 through MEM3, can be the same or similar to memory devices discussed with reference to any of the figures herein. Generally, processing/caching agents send requests to a home node for access to a memory address with which a corresponding "home agent" is associated. Also, in one embodiment, MEM0 through MEM3 can be configured to mirror data, e.g., as master and slave. Also, one or more components of system 200 can be included on the same integrated circuit die in some embodiments.

Furthermore, one implementation (such as shown in FIG. 2) is for a socket glueless configuration with mirroring. For example, data assigned to a memory controller (such as MC0/HA0) is mirrored to another memory controller (such as MC3/HA3) over the PtP links.

Figure 3:
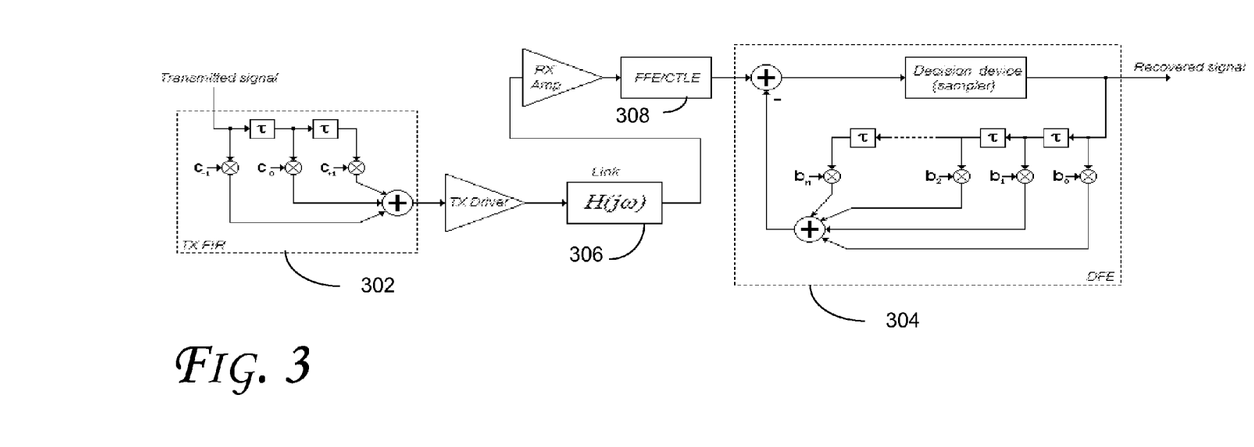
FIGS. 3 and 4 illustrate block diagrams of receive logic and transmit logic, which are utilized to implement various embodiments discussed herein.
Figure 4:
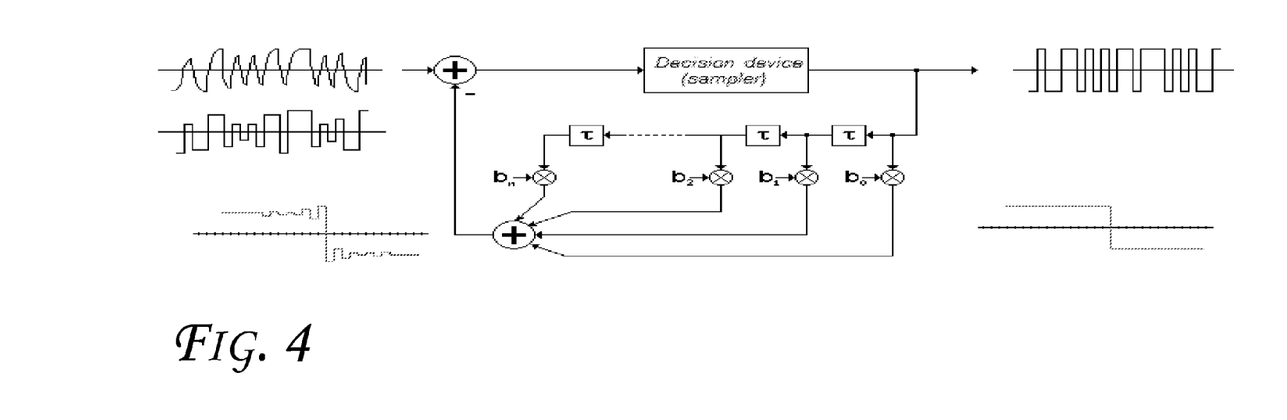

FIGS. 3 and 4 illustrate block diagrams of receive and transmit logic, according to some embodiments. More specifically, FIG. 3 illustrates a block diagram of a high-speed interconnect system with equalizer logic and FIG. 4 illustrates the step-response of the DFE logic and FIR logic and how the RX structure leads to ISI equalization. In some embodiments, one or more components of the systems of FIG. 1, 2, 6, or 7 (such as the IOH 120, RC 122, and/or the PCIe Controller 135) include the logic shown in FIGS. 3 and 4.

Referring to FIG. 3, a transmitted signal is received at a TX FIR filter logic 302 which is passed to a DFE logic 304 (e.g., through a TX driver, link 306, RX amplifier, and an FFE/CTLE logic 308). The link 306 can be the same or similar to the links discussed with reference to FIG. 1. As shown in FIG. 3, the TX FIR filter logic 302 includes a delayed-tap TX FIR filter (e.g., 3-tap delayed FIR in FIG. 3) used to pre-emphasize the high frequency content of the transmitted signal over the lower frequency content (e.g., pre-distortion to counteract channel-induced distortion at high frequencies). Also, the DFE logic 304 is preceded by a FFE or CTLE logic 308. The FFE logic is generally a linear equalizer (LE) logic in discrete or Continuous Time LE (CTLE) to compensate pre-cursor ISI, but it can also amplify link-induced additive noise. However, the DFE logic 304 is non-linear and its operation is based on past decisions (i.e., past recovered signal values) such that it is capable of mitigating noise-enhancement of the FFE/CTLE logic 308.

Figure 5:
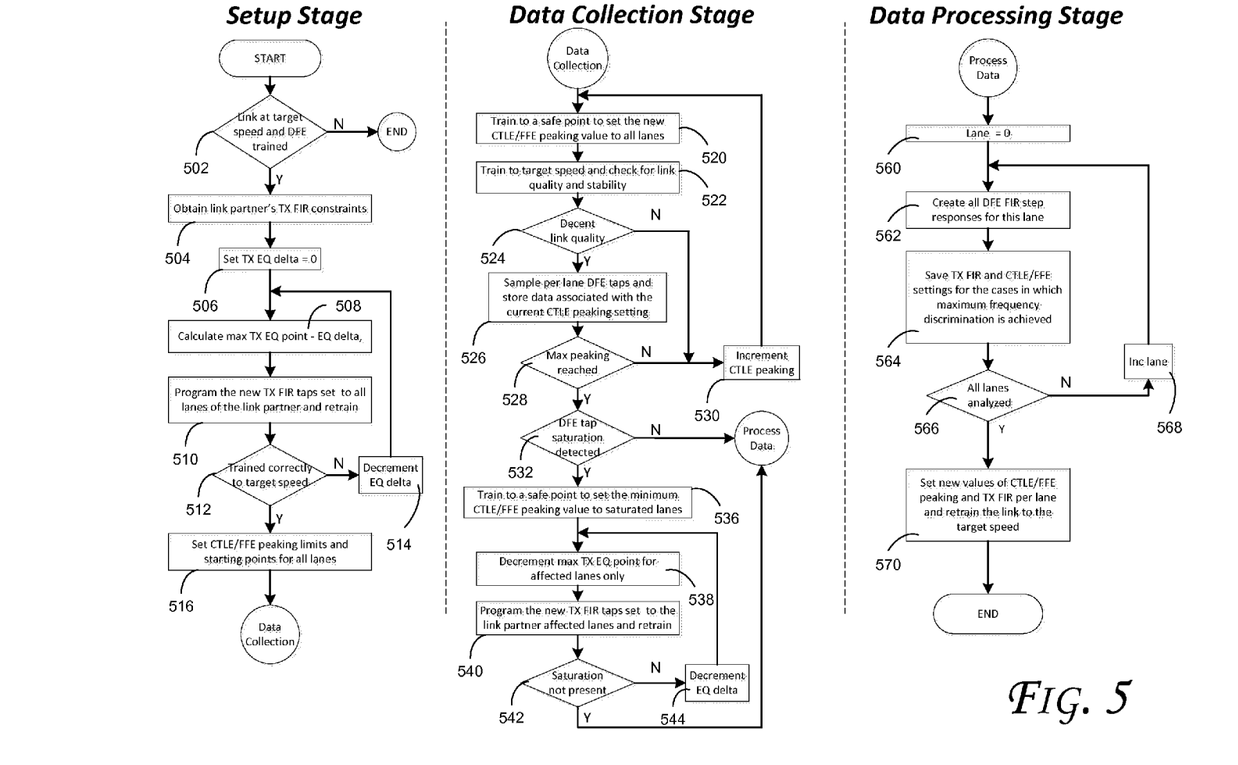
FIG. 5 illustrates flow diagrams of methods, according to some embodiments.

FIG. 5 illustrates flow diagrams of methods for implementing balanced equalization in high-speed links, according to some embodiments. As illustrated, methods for three separate stages are shown (i.e., setup stage, data collection stage, and data processing stage). In various embodiments, the operations discussed with reference to FIG. 5 are performed by one or more of the components discussed with reference to FIGS. 1, 2, 3, 4, 6, and/or 7 (such as logic 120, 122, 135, 302, 304, 308, etc.).

Referring to FIG. 5, the setup stage is performed prior to the actual implementation of the balanced equalization to prepare the logic. At an operation 502, it is determined whether the link (e.g., link 306 of FIG. 3) is at a target speed and DFE is trained. If so, the setup stage ends; otherwise, at an operation 504, the constraint(s) for the TX FIR partner are obtained. At an operation 506, TX equalization (EQ) is initialized (e.g., set to zero). At an operation 508, the maximum TX equalization point (minus EQ-delta) is calculated. At an operation 510, the new TX FIR taps are programmed to all lanes of the link partner and the link is retrained. At an operation 512, it is determined whether the training is correct for the target speed of the link. If not, as an operation 514, the equalization delta is decremented; otherwise, CTLE/FFE peaking limits and starting points for all lanes are set at operation 516. After operation 516, the data collection stage is initiated.

As shown in FIG. 5, the data collection stage, starts at operation 520, where training is performed to a safe point to set the new CTLE/FFE peaking value to all lanes. At operation 522, training is performed to a target speed and the link is checked for quality and stability. At an operation 524, it is determined whether the link quality is acceptable (e.g., BER that is below the target BER). If acceptable, at an operation 526, per lane DFE taps are sampled and the data associated with the current CTLE peaking setting is stored (e.g., in any of the storage devices discussed herein). At an operation 528, it is determined whether the maximum CTLE/FFE peaking setting has been reached. If not, operation 530 increments the CTLE/FFE peaking setting. At an operation, 532, it is determined whether DFE tap saturation has been detected for any lane. If no DFE tap saturation then the process data stage is initiated; otherwise when a lane has DFE tap saturation, at operation 536, training is performed to a safe point to set the minimum CTLE/FFE peaking value to saturated lanes. At operation 538, the maximum TX equalization point is decremented for affected lanes only (i.e., lanes with DFE tap saturation). At 540, the new TX FIR taps set is programmed to the link partner affected lanes and the link is retrained.

At an operation 542, it is determined whether saturation is absent. If saturation is still present, at an operation 544, the EQ-delta is decremented and the sequence of operations 538, 540, and 542 is repeated; otherwise if no saturation, the process data stage is initiated.

Once all data is collected, the data processing stage is initiated where the step response of the DFE FIR is generated and analyzed. For example, at an operation 560, a lane is selected (e.g., lane zero is selected). At an operation 562, all DFE FIR step responses for the selected lane are generated. At an operation 564, TX FIR and CTLE/FFE settings for the cases in which maximum frequency discrimination is achieved (e.g., higher bandwidth (B/W) step response) are stored/saved (e.g., to any of the storage devices discussed herein). At an operation 566, it is determined whether all lanes have been analyzed. If not, the next lane is selected; otherwise if they have all been analyzed, at an operation 570, new values of the CTLE/FFE peaking and TX FIR per lane are set and the link is retrained to the target speed.

In an embodiment, the TX equalization is maximized (e.g., allowed pre/post-cursors), while increasing the CTLE/FFE equalization setting towards a maximum. On every step of this excursion, the final state of the DFE after training is stored (e.g., in one or more of the storage devices discussed herein). If DFE tap saturation is detected (i.e., no change of a tap with peaking), the TX equalization is symmetrically decreased (e.g., decrease pre/post-cursors by one and add two to post cursor). The decrementing is continued until saturation is no longer observed. This is a clear indication of a short (e.g., low distortion) link requiring little equalization on both sides.

Moreover, the DFE FIR input space can be discrete, so its output can be a finite set of values. Given that the input includes sequences of +1 and −1, a DFE FIR step response is reconstructed based on the stored final tap values for each case. In some embodiments, since this DFE FIR responds only to different frequency steps from the samplers output, a simulated step response can be used as a model to analyze the "frequency discrimination" of the DFE FIR by the shape of the reconstructed step. An over-damped response indicates low frequency content of the FIR which means that the DFE post-cursor ISI compensation is not doing much for high frequency content and CTLE/FFE is overworking. A sub-damped oscillating response indicates that the DFE is compensating in a different way for different frequency ranges, meaning that it is performing at its maximum frequency discrimination. This translates to complex ISI removal on mostly high frequencies which is what DFE is supposed to do. In long channels, this can result in higher peaking values than in mid-length channels. Also, if the information gathered shows a poor discrimination, then the TX FIR was too high and has to be reduced. This is an extreme case in short channels and an initial condition in medium length channels. Once satisfactory discrimination is achieved, the values of TX FIR coefficients and CTLE/FFE peaking are applied to the receiver and a new training loop is executed for the new settings to take place.

In some embodiments, the operations discussed with reference to FIG. 5 are performed with the following assumptions: (a) the link channel follows, in order, a TX FIR logic, link, CTLE, and DFE equalization architecture; (b) the link is capable of training to the target speed with an acceptable quality (e.g., low BER that is below a target BER); (c) the TX FIR taps on the link partner are controllable and the allowed value ranges are known. (e.g., in PCIe 3.0 links, this is given by the FS (Full Swing) and LF (Low Frequency) parameters exchanged in equalization phase 1 stage; also, the link partner's per lane FS and LF are architecturally visible to the algorithm if BEE is done via software); (d) the CTLE/FFE of the LE stage is controllable (e.g., the bandwidth characteristic of this linear first stage equalizer needs to be controllable, e.g., including gain and peaking controls); (e) the DFE taps are observable (e.g., if BEE is done via software, then the values of these taps per lane are visible to the algorithm); and/or (f) DFE adaptation works as expected via either LMS (Least-Mean Square) or other applicable adaptive methods (e.g., the DFE/LMS works as an approximate piecewise linear identification of the channel's post cursor ISI).

Figure 6:
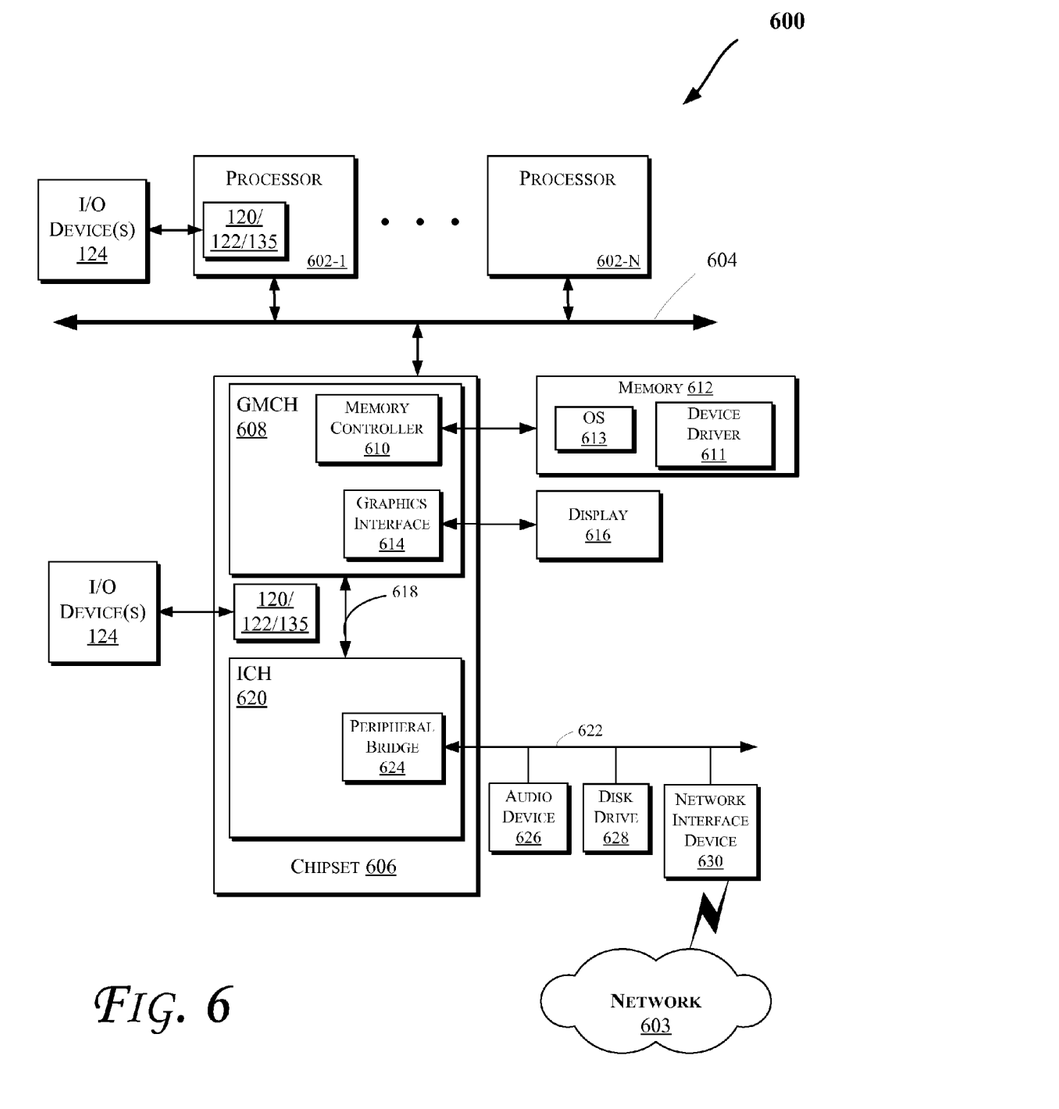

FIG. 6 illustrates a block diagram of a computing system 600 in accordance with an embodiment of the invention. The computing system 600 includes one or more central processing unit(s) (CPUs) 602-1 through 602-N or processors (collectively referred to herein as "processors 602" or more generally "processor 602") that communicate via an interconnection network (or bus) 604. The processors 602 include a general purpose processor, a network processor (that processes data communicated over a computer network 603), or other types of a processor (including a reduced instruction set computer (RISC) processor or a complex instruction set computer (CISC)). Moreover, the processors 602 can have a single or multiple core design. The processors 602 with a multiple core design can integrate different types of processor cores on the same integrated circuit (IC) die. Also, the processors 602 with a multiple core design can be implemented as symmetrical or asymmetrical multiprocessors.

Also, the operations discussed with reference to FIGS. 1-5 are performed by one or more components of the system 600. In some embodiments, the processors 602 can be the same or similar to the processors 202-208 of FIG. 2. Furthermore, the processors 602 (or other components of the system 600) include one or more of the IOH 120, RC 122, and the PCIe Controller 135. Moreover, even though FIG. 6 illustrates some locations for items 120/122/135, these components can be located elsewhere in system 600. For example, I/O device(s) 124 can communicate via bus 622, etc.

A chipset 606 also communicates with the interconnection network 604. The chipset 606 includes a graphics and memory controller hub (GMCH) 608. The GMCH 608 includes a memory controller 610 that communicates with a memory 612. The memory 612 stores data, including sequences of instructions that are executed by the CPU 602, or any other device included in the computing system 600. For example, the memory 612 stores data corresponding to an operation system (OS) 613 and/or a device driver 611 as discussed with reference to the previous figures. In an embodiment, the memory 612 and memory 140 of FIG. 1 can be the same or similar. In one embodiment of the invention, the memory 612 can include one or more volatile storage (or memory) devices such as random access memory (RAM), dynamic RAM (DRAM), synchronous DRAM (SDRAM), static RAM (SRAM), or other types of storage devices. Nonvolatile memory can also be utilized such as a hard disk. Additional devices can also communicate via the interconnection network 604, such as multiple CPUs and/or multiple system memories.

Additionally, one or more of the processors 602 can have access to one or more caches (which include private and/or shared caches in various embodiments) and associated cache controllers (not shown). The cache(s) can adhere to one or more cache coherent protocols. Such cache(s) store data (e.g., including instructions) that are utilized by one or more components of the system 600. For example, the cache locally caches data stored in a memory 612 for faster access by the components of the processors 602. In an embodiment, the cache (that is shared) can include a mid-level cache and/or a last level cache (LLC). Also, each processor 602 can include a level 1 (L1) cache. Various components of the processors 602 can communicate with the cache directly, through a bus or interconnection network, and/or a memory controller or hub.

The GMCH 608 also includes a graphics interface 614 that communicates with a display device 616, e.g., via a graphics accelerator. In one embodiment of the invention, the graphics interface 614 can communicate with the graphics accelerator via an accelerated graphics port (AGP). In an embodiment of the invention, the display 616 (such as a flat panel display) can communicate with the graphics interface 614 through, for example, a signal converter that translates a digital representation of an image stored in a storage device such as video memory or system memory into display signals that are interpreted and displayed by the display 616. In an embodiment, the display signals produced by the display device pass through various control devices before being interpreted by and subsequently displayed on the display 616.

A hub interface 618 allows the GMCH 608 and an input/output control hub (ICH) 620 to communicate. The ICH 620 provides an interface to I/O devices that communicate with the computing system 600. The ICH 620 communicates with a bus 622 through a peripheral bridge (or controller) 624, such as a peripheral component interconnect (PCI) bridge, a universal serial bus (USB) controller, or other types of peripheral bridges or controllers. The bridge 624 provides a data path between the CPU 602 and peripheral devices. Other types of topologies can be utilized. Also, multiple buses can communicate with the ICH 620, e.g., through multiple bridges or controllers. Moreover, other peripherals in communication with the ICH 620 include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 communicates with an audio device 626, one or more disk drive(s) 628, and a network interface device 630 (which is in communication with the computer network 603). Other devices can also communicate via the bus 622. Also, various components (such as the network interface device 630) can communicate with the GMCH 608 in some embodiments of the invention. In addition, the processor 602 and one or more components of the GMCH 608 and/or chipset 606 are combined to form a single integrated circuit chip (or be otherwise present on the same integrated circuit die) in some embodiments.

Furthermore, the computing system 600 includes volatile and/or nonvolatile memory (or storage). For example, nonvolatile memory includes one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
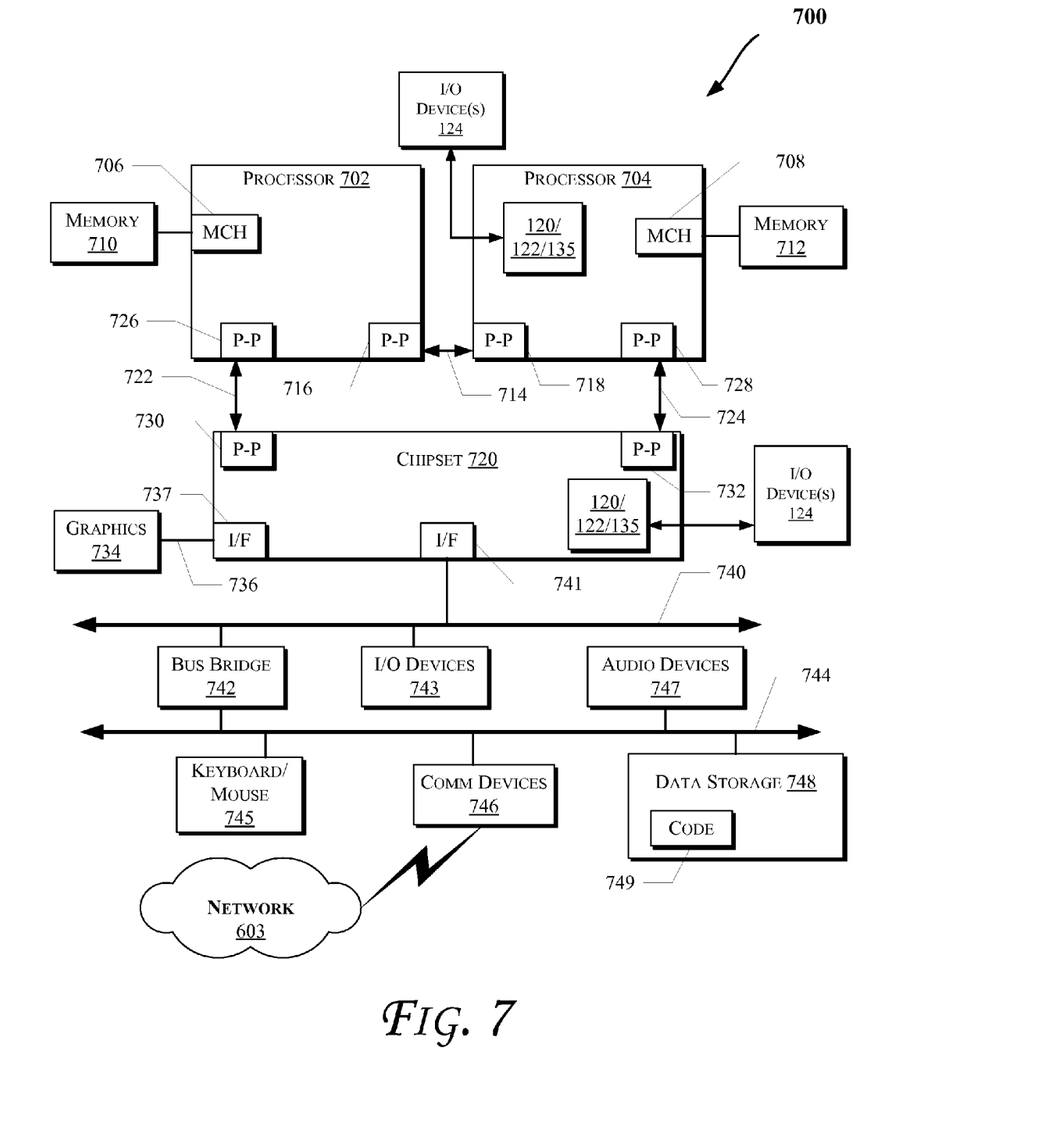

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 are performed by one or more components of the system 700.

As illustrated in FIG. 7, the system 700 includes several processors, of which only two, processors 702 and 704 are shown for clarity. The processors 702 and 704 each include a local memory controller hub (MCH) 706 and 708 to enable communication with memories 710 and 712. The memories 710 and/or 712 store various data such as those discussed with reference to the memory 612 of FIG. 6. As shown in FIG. 7, the processors 702 and 704 also include the cache(s) discussed with reference to FIG. 6 in some embodiments.

In an embodiment, the processors 702 and 704 can be one of the processors 602 discussed with reference to FIG. 6. The processors 702 and 704 exchange data via a point-to-point (PtP) interface 714 using PtP interface circuits 716 and 718, respectively. Also, the processors 702 and 704 each exchange data with a chipset 720 via individual PtP interfaces 722 and 724 using point-to-point interface circuits 726, 728, 730, and 732. The chipset 720 further exchanges data with a high-performance graphics circuit 734 via a high-performance graphics interface 736, e.g., using a PtP interface circuit 737.

At least one embodiment of the invention is provided within the processors 702 and 704 or chipset 720. For example, the processors 702 and 704 and/or chipset 720 include one or more of the IOH 120, RC 122, and the PCIe Controller 135. Other embodiments of the invention, however, exist in other circuits, logic units, or devices within the system 700 of FIG. 7. Furthermore, other embodiments of the invention can be distributed throughout several circuits, logic units, or devices illustrated in FIG. 7. Hence, location of items 120/122/135 shown in FIG. 7 is exemplary and these components may or may not be provided in the illustrated locations.

The chipset 720 communicates with a bus 740 using a PtP interface circuit 741. The bus 740 can have one or more devices that communicate with it, such as a bus bridge 742 and I/O devices 743. Via a bus 744, the bus bridge 742 communicates with other devices such as a keyboard/mouse 745, communication devices 746 (such as modems, network interface devices, or other communication devices that communicate with the computer network 603), audio I/O device, and/or a data storage device 748. The data storage device 748 stores code 749 that is executed by the processors 702 and/or 704.

In various embodiments of the invention, the operations discussed herein, e.g., with reference to FIGS. 1-7, can be implemented as hardware (e.g., circuitry), software, firmware, microcode, or combinations thereof, which can be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7. Additionally, such computer-readable media may be downloaded as a computer program product, wherein the program is transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic to detect data corresponding to a plurality of transmit equalization values and a plurality of receive equalization values for each lane of a link having a plurality of lanes; and
   logic to determine which of the plurality of the transmit equalization values and which of the plurality of the receive equalization values are to be selected for each lane of the plurality of lanes of the link based on detection of saturation in a Decision Feedback Equalizer (DFE) tap of a corresponding lane of the link.

2. The apparatus of claim 1, wherein the plurality of transmit equalization values correspond to a transmit Finite Impulse Response (FIR) filter.

3. The apparatus of claim 1, wherein the plurality of receive equalization values correspond to a receive DFE filter.

4. The apparatus of claim 1, further comprising logic to generate step responses for a receive DFE filter and a transmit FIR filter coupled to each lane of the plurality of lanes of the link.

5. The apparatus of claim 4, further comprising logic to analyze the generated step responses.

6. The apparatus of claim 1, further comprising logic to retrain the link in accordance with a selected transmit equalization value and a receive equalization value.

7. The apparatus of claim 1, further comprising memory to store the detected data.

8. The apparatus of claim 1, wherein the link is to couple a first agent to a second agent, wherein the first agent is to comprise one or more of: a processor core, a chipset, an input/output hub, and a memory controller.

9. The apparatus of claim 1, wherein the link is to couple a first agent to a second agent, wherein the second agent is to comprise an input/output device.

10. The apparatus of claim 1, wherein the link is to comprise a point-to-point coherent interconnect.

11. The apparatus of claim 1, wherein the link is to couple a first agent to a second agent, wherein the first agent is to comprise a plurality of processor cores and one or more sockets.

12. The apparatus of claim 1, wherein the link is to couple a first agent to a second agent, wherein one or more of the first agent, the second agent, and a memory are on a same integrated circuit chip.

13. The apparatus of claim 1, wherein the link comprises a Peripheral Component Interconnect Express (PCIe) link.

14. A method comprising:
   detecting data corresponding to a plurality of transmit equalization values and a plurality of receive equalization values for each lane of a link having a plurality of lanes; and
   determining which of the plurality of the transmit equalization values and which of the plurality of the receive equalization values are to select for each lane of the plurality of lanes of the link based on detection of saturation in a Decision Feedback Equalizer (DFE) tap of a corresponding lane of the link.

15. The method of claim 14, further comprising generating step responses for a receive DFE filter and a transmit FIR filter coupled to each lane of the plurality of lanes of the link.

16. The method of claim 15, further comprising analyzing the generated step responses.

17. The method of claim 14, further comprising retraining the link in accordance with a selected transmit equalization value and a receive equalization value.

18. The method of claim 14, further comprising storing the detected data.

19. The method of claim 14, wherein the plurality of transmit equalization values correspond to a transmit Finite Impulse Response (FIR) filter.

20. The method of claim 14, wherein the plurality of receive equalization values correspond to a receive DFE filter.

21. A computing system comprising:
   an input/output hub to couple a processor core and an input/output device via a link; and
   the input/output hub includes:
      logic to detect data corresponding to a plurality of transmit equalization values and a plurality of receive equalization values for each lane of a link having a plurality of lanes; and
      logic to determine which of the plurality of the transmit equalization values and which of the plurality of the receive equalization values are to be selected for each lane of the plurality of lanes of the link based on detection of saturation in a Decision Feedback Equalizer (DFE) tap of a corresponding lane of the link.

22. The computing system of claim 21, wherein the plurality of transmit equalization values correspond to a transmit Finite Impulse Response (FIR) filter.

23. The computing system of claim 21, wherein the plurality of receive equalization values correspond to a receive DFE filter.

24. The computing system of claim 21, further comprising logic to generate step responses for a receive DFE filter and a transmit FIR filter coupled to each lane of the plurality of lanes of the link.

25. The computing system of claim 24, further comprising logic to analyze the generated step responses.

26. The computing system of claim 21, further comprising logic to retrain the link in accordance with a selected transmit equalization value and a receive equalization value.

27. The computing system of claim 21, further comprising memory to store the detected data.

28. A non-transitory computer-readable medium comprising one or more instructions that when executed on a processor configure the processor to perform one or more operations to:
  detect data corresponding to a plurality of transmit equalization values and a plurality of receive equalization values for each lane of a link having a plurality of lanes; and
  determine which of the plurality of the transmit equalization values and which of the plurality of the receive equalization values are to select for each lane of the plurality of lanes of the link based on detection of saturation in a Decision Feedback Equalizer (DFE) tap of a corresponding lane of the link.

29. The non-transitory computer-readable medium of claim 28, wherein the one or more instructions when executed on the processor are to configure the processor to generate step responses for a receive DFE filter and a transmit FIR filter coupled to each lane of the plurality of lanes of the link.

30. The non-transitory computer-readable medium of claim 28, wherein the one or more instructions when executed on the processor are to configure the processor to retrain the link in accordance with a selected transmit equalization value and a receive equalization value.

* * * * *